United States Patent [19]

Hughes et al.

[11] Patent Number: 4,730,307
[45] Date of Patent: Mar. 8, 1988

[54] METHOD AND APPARATUS FOR LOCAL AREA NETWORKS

[75] Inventors: William C. Hughes, Scotia; Charles R. Stein, Schenectady, both of N.Y.

[73] Assignee: General Electric Company, Schenectady, N.Y.

[21] Appl. No.: 934,283

[22] Filed: Nov. 24, 1986

[51] Int. Cl.[4] .............................. H04J 3/02; H04J 3/24
[52] U.S. Cl. ........................................ 370/85; 370/94
[58] Field of Search ................ 370/85, 89, 94, 60, 370/95; 340/825.5

[56] References Cited

U.S. PATENT DOCUMENTS

| 4,506,361 | 3/1985 | Kume | 370/85 |
|---|---|---|---|
| 4,517,670 | 5/1985 | Ulug | 370/85 |
| 4,536,877 | 8/1985 | Livingston et al. | 370/85 |
| 4,551,833 | 11/1985 | Turner | 370/94 |

OTHER PUBLICATIONS

"D-Net, A New Scheme for High Data Rate Optical Local Area Networks" by Tseng et al, IEEE Journal on Selected Areas of Communications, vol. SAC-1, No. 3, Apr. 1983.

Primary Examiner—Douglas W. Olms
Assistant Examiner—Frank M. Scutch, III
Attorney, Agent, or Firm—Richard V. Burgujian; James C. Davis, Jr.; Paul R. Webb, II

[57] ABSTRACT

A bus accessing method and apparatus for the practice thereof, in a communication network, for transmitting information packets without the need for long communication periods following each transmission, is disclosed. The network comprises transmit and receive buses, a plurality of BIUs coupled between the buses, and a head-end for directing packets leaving the transmit bus onto the receive bus. Each packet has a preamble with a gap long enough to enable receiving BIUs to reset for receipt of a new packet. Each BIU in an active state with a packet to transmit measures a first time period so long as it detects no signals on the receive bus. The BIU transitions to a wait state upon completing the first time period measurement and initiates a second time period measurement. Upon completing the second time period measurement, the BIU transitions to a transmit state and initiates transmission of its packet, reverting to the active state upon completing transmission. The BIU transitions to the preempted state if upstream signals are detected during the second time period measurement or during transmission. In the preempted state the BIU measures a third time period so long as no upstream signals are detected and upon completing this measurement transitions to the transmit state.

36 Claims, 9 Drawing Figures

METHOD AND APPARATUS FOR LOCAL AREA NETWORKS

The present invention relates, in general, to local area networks (LANs) and, more specifically, to LANs in which contention schemes are used.

BACKGROUND OF THE INVENTION

LANs to enable communication between various types of computing devices are well known in the art. Each of the various computing devices is connected to the LAN via a bus interface unit (BIU). LANs utilize protocols of various types, also well known in the art, to allow communication over the network to be conducted in an expedient and efficient manner. In particular, it is a desirable feature of such protocols to minimize the delay incurred by a BIU in waiting for access to the transmission medium in order to transmit an information packet from its associated computing device. It is also a desirable feature to maximize the effective data rate of the medium, i.e. the number of information packets successfully transmitted on the medium per unit time.

A contention bus accessing protocol, well known in the art, is one in which, generally, each BIU gains access to the transmission medium to transmit its information packet(s) at any time the subject BIU determines the transmission medium is idle. When more than one BIU attempts to gain access to the transmission medium simultaneously, a collision occurs and each BIU generally discontinues its transmission for a randomly selected time interval, thereafter reattempting to gain access to the medium. Examples of such a control structure are found in LANs following IEEE 802.3 and the Ethernet (a trademark of Xerox Corporation) specifications for a carrier-sense multiple-access (CSMA/CD) protocol. Such protocols generally incur unacceptable delays at times when many BIUs have information packets to transmit and therefore may collisions occur. Further, the loss of all information packets involved in each collision has an adverse impact on the effective transmission medium data rate. Additionally, since access to the medium after each collision is determined by a random time factor, it is impossible to establish an upper bound on the maximum time interval between times when a BIU gains access to the transmission medium.

The preemptive BID Communication System, disclosed in U.S. Pat. No. 4,517,670, which is incorporated in its entirety herein by reference, provides an improved contention protocol wherein, of the the BIUs involved in a collision, one is enabled to continue information packet transmission. The other BIUs involved in the collision are designated preempted BIUs and are allowed to transmit following the collision. In accordance with that protocol, a series of communication periods are provided for the preempted BIUs after the collision. During each communication period, the preempted BIUs follow a method which allows them to determine, in accordance with their respective physical locations along the network transmission medium, which one of them can transmit its information packet(s). After each preempted BIU successfully completes its transmission, another communication period is commenced, this repetitive cycle being continued until all preempted BIUs successfully transmit their respective information packets. Following transmission by the last preempted BIU and before BIUs again contend for bus access, the BIUs must wait for one additional communication period. Further in accordance with the Preemptive BID protocol, even when there are no preempted BIUs, a communication period follows each successful packet transmission. Additionally, each BIU independently enters a captive mode, upon successfully transmitting its information packet, during which it refrains from attempting to gain bus access. Each captive mode BIU cannot leave that mode until it successfully measures a captive period during which the system transmit and receive buses are silent. The captive and communication periods are each typically chosen equal to the two-way propagation delay in the network transmission medium.

In order to enable continued transmission by one BIU involved in a collision, the Preemptive BID protocol additionally requires each information packet to carry an excessively long preamble portion, e.g. a preamble having a transmission time on the order of the network medium two-way propagation delay. Thus, the Preemptive BID protocol provides improvements, over the CSMA/CD protocol described above, by preserving one information packet in a collision and affording BIUs with the preempted status an immediate opportunity to transmit their respective packets. However, it also carries a substantial overhead, to wit, the long communication and captive periods and long information packet preamble both of which serve to degrade the effective transmission medium data rate. Further, the Preemptive BID system is a complex protocol and is therefore difficult to implement.

It is therefore an object of the present invention to provide a protocol, for transmitting information packets in a LAN, which is relatively easy to implement, which maximizes transmission medium effective data rate and for which can be determined a maximum limit on the interval between times when a BIU can gain access to the medium.

SUMMARY OF THE INVENTION

In accordance with the present invention, there is provided a bus accessing method and a communication system for practicing the method. The communication system comprises a transmit bus, a receive bus, means for directing signals leaving the transmit bus onto the receive bus and a plurality of BIUs respectively coupled between the transmit and receive buses, each BIU being coupled to a user device for which it transmits and receives information packets. Each BIU includes means for detecting signals on the transmit bus originating from an upstream direction away from the directing means, means for detecting signals on the receive bus, and means for measuring a first, a second, and a third time period. The information packet transmitted in accordance with the present invention has a preamble including a gap portion, the gap being of sufficient length to enable receiving BIUs to reset for a new packet. The length of the preamble is unrelated to the length of the transmission medium.

Each BIU having an information packet to transmit is in an active state and initiates measurement of the first time period upon detecting the absence of signals on the receive bus, but ceases the first time period measurement upon detecting the presence of receive bus signals, reinitiating the first time period measurement only upon subsequently detecting an absence of receive bus signals. The BIU transitions from the active state to a wait state upon successfully completing the first time period measurement and then respectively initiates measurement of the second time period. If, while measuring the second time period the BIU detects upstream signals, it ceases the second time period measurement and transitions to the preempted state. The BIU in the wait state upon successfully completing the second time period measurement transitions to a transmit state in which it commences transmission of its information packet. If, while transmitting, the BIU detects upstream signals, it ceases transmission and transitions to the preempted state. The BIU in the preempted state initiates measurement of the third time period upon detecting a cessation of upstream signals. The BIU ceases that measurement upon detecting upstream signals, reinitiating the third time period measurement only upon the subsequent cessation of the upstream signals. The preempted state BIU transitions to the transmit state upon successfully completing the third time period measurement. Each BIU upon successfully completing information packet transmission, reverts to the active state.

In operation, for a group of active state BIUs contending for transmit bus access, only the most upstream BIU successfully transitions to the transmit state and completes transmission of its information packet, the remaining BIUs in the group transitioning to the preempted state. The remaining BIUs respectively transition to the transmit state and successfully transmit their respective information packets in an order according to their serial positions along the transmit bus from upstream to downstream. A first silent period equal to the third time period, which is shorter than the first time period, separates the information packets in the packet sequence transmitted by the group of BIUs so that active state BIUs cannot complete the first time period measurement until the sequence is complete. Thus, the present invention enables transmission of a packet having a preamble length unrelated to the transmission medium length and, further, enables the BIUs to transmit their packets without the need for a communication or captive period following each transmission.

In an alternate embodiment of the present invention, each BIU transitioning to the transmit state from the wait state transmits an information packet having a preamble including the gap. However, preempted state BIUs upon transitioning to the transmit state commence transmission of a packet having a short preamble without the gap.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

DESCRIPTION OF THE INVENTION

Figure 1:
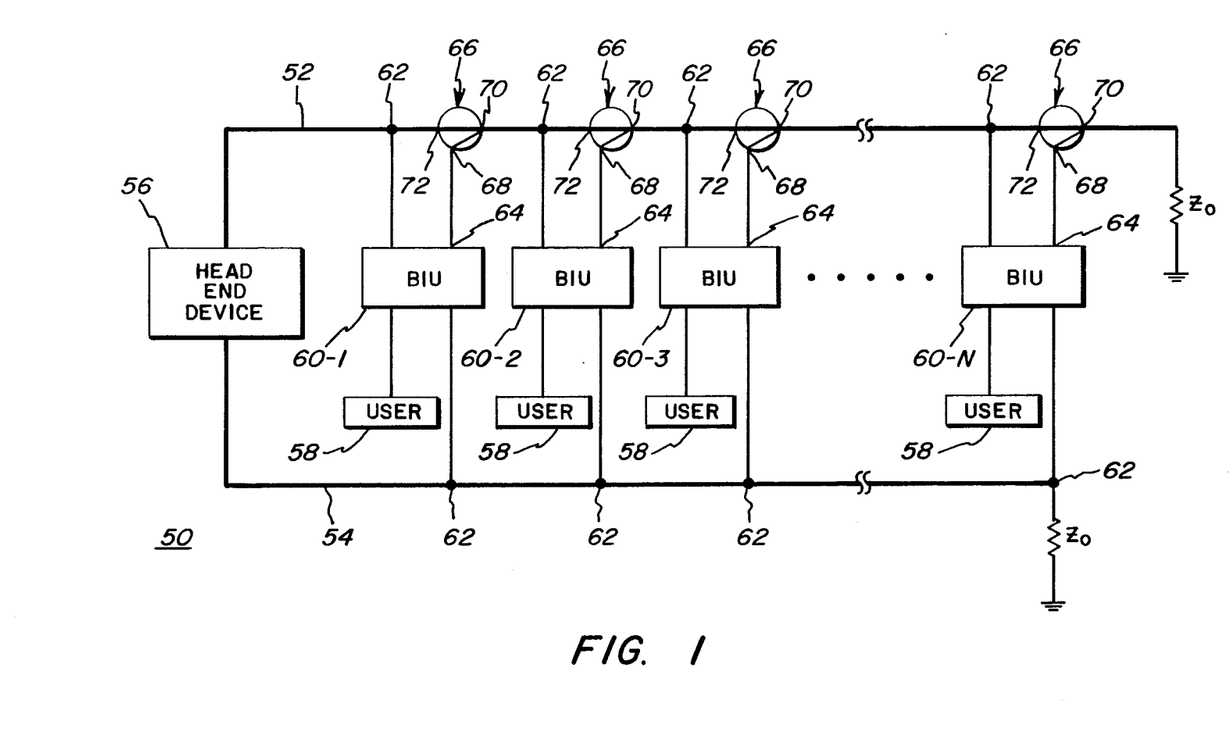
FIG. 1 is a block diagram of a communication network including apparatus which is the subject of the present invention and adapted to practice the method of the present invention.

Referring now to the drawings, FIG. 1 shows a local area communication network (LAN) 50 in which the bus accessing protocol of the present invention may be practiced. Network 50 comprises a signal transmission network including a transmit bus 52 and a receive bus 54, each bus being connected as a serial straight-line topology. A head-end device 56 is provided for receiving transmission signals from transmit bus 52 and directing, by retransmission, these signals onto receive bus 54. Each bus 52 and 54 comprises a transmission medium such as a fiber optic or a coaxial cable and is unidirectional in operation. For example, the transmit and receive buses may each comprise a coaxial cable, as available from Belden Electric and Wire Cable Company, for transmitting AC modulated digital information signals. As a further example, the buses may comprise high performance fiber optic cable, such as is available from Hewlett Packard Company, part number HFBR3001, for transmitting optical digital information signals. It will be appreciated by those skilled in the art that while transmit bus 52 and receive bus 54 are shown as discrete elements in FIG. 1, they may actually comprise the same physical coaxial cable wherein transmissions occur in a first electrical frequency band and reception occurs in a second electrical frequency band. If necessary, the pair of buses 52 and 54 may be folded upon itself to provide a star. A branching tree topology is also possible.

Signals on transmit bus 52 propagate in a downstream direction toward head-end 56, while signals on receive bus 54 propagate in an upstream direction away from the head-end. The ends of the transmit and receive buses remote from the head-end may be terminated in a characteristic impedance $Z_O$ when buses 52 and 54 consist of coaxial cables and with a nonreflective surface when the buses consist of fiber optic cables. The buses are so terminated in order to dissipate signals and prevent reflections thereof along the bus.

A plurality of user terminals or data terminal equipment 58 are connected to buses 52 and 54 via a plurality of bus interface units (BIU) 60-1, 60-2, 60-3, . . . , 60-N (each BIU being generically referred to hereinafter as BIU 60), the BIUs being connected in parallel with one another between buses 52 and 54. The terms upstream and downstream, as used herein with respect to the BIUs, indicate BIU 60-N as being the most upstream and BIU 60-1 as being the most downstream. Each BIU 60 may have a plurality of user terminals coupled thereto, typically via ports (not shown) wherein each port of BIU 60 is assigned an identification address. User terminals 58 may be computers, terminals or other devices capable of generating and/or accepting electronic information. Network 50 enables any user terminal 58 to transmit messages to any other user terminal 58.

Each BIU 60 receives messages from the user terminal(s) coupled thereto for transmission to other user terminals and formats the data into an information packet. In order to transmit the information packet, the BIU places the packet to be transmitted on transmit bus 52, the method by which each BIU gains access to bus 52 for the purpose of transmitting its packet being more fully described below. Information packets are received by each BIU 60 via receive bus 54 after being directed thereon by head-end 56. As described above, head-end 56 is provided for receiving transmissions from the transmit bus and retransmitting this information onto the receive bus. When the transmit and receive buses comprise the same physical cable, head-end 56 may be further adapted to receive signals from transmit bus 52 in a first frequency range and retransmit these signals to receive bus 54 in a second frequency range. Similarly, where the transmit and receive buses comprise separate physical cables, head-end 56 may be adapted to frequency division multiplex the signals by transmitting and receiving over a plurality of different frequency bands where the different frequency bands correspond to different communication channels to which the BIUs are assigned. Alternatively, where the transmit and receive buses comprise separate physical cables, head-end 56 may comprise an amplifier, a repeater or other similar device for receiving and retransmitting signals and need not comprise a frequency translator as described above. Further, where the transmit and receive buses comprise separate cables, and where there is no need for signal amplification/reconstruction, the head-end may simply comprise a hard-wire connection between the buses.

Where buses 52 and 54 consist of coaxial cable, a transmit port $T_x$ and a receive port $R_x$ of each BIU 60 are respectively coupled through couplers 62 to the transmit and receive buses for the transmission and receipt of information packets. Couplers 62 are selected to have low insertion loss in the straight through transmission path of each bus. An energy detect port 64 of each BIU 60 is coupled to transmit bus 52 through a directional coupler 66. Each directional coupler 66 has low insertion loss (typically less than 1 db) in the straight through transmission path of bus 52 and a moderate reverse coupling factor (typically at least −12 db) between an input port 68 thereof connected to energy detect port 64 of BIU 60 and another input port 70 thereof connected to bus 52 from upstream BIUs. Directional coupler 66 provides a low forward coupling factor from input port 68 to a downstream output port 72 thereof, typically about −30 db. Directional coupler 66 may comprise a CATV tap model DC-12B as available from the Jerrold Electronics Company. Where buses 52 and 54 are constructed of fiber optic cable, each BIU is coupled thereto by passive couplers, such as manufactured by ADC Magnetic Controls Company of Minneapolis, Minn. as a 3 port coupler model PFC.

The manner in which user terminal information or data is transmitted from user terminals 58 to their respective BIUs 60, and the method of properly formatting data from information packets as the data are transferred to each user terminal from the BIU associated therewith, are well known in the art and do not form part of the present invention. Accordingly, the specific methods and apparatus for carrying out these transfers will not be described herein. Data as used herein includes digital data, encoded voice and other forms of intelligence which may be transferred between components of the system. An exemplary method for achieving these results may be found in International Standard CCITT X.25. The present invention concerns the bus accessing method under which the information packets, once properly formatted according to a packetswitching mode of operation, are transferred from BIUs 60 to bus 52. Accordingly, it is assumed that information or data is occasionally transferred from user terminals 58 to their associated BIUs 60 and is formatted for transmission by BIU 60. It is also assumed that information packets received by BIUs 60 are reformatted and the data or voice messages therefrom are transferred to their appropriate associated user terminals.

Figure 2:
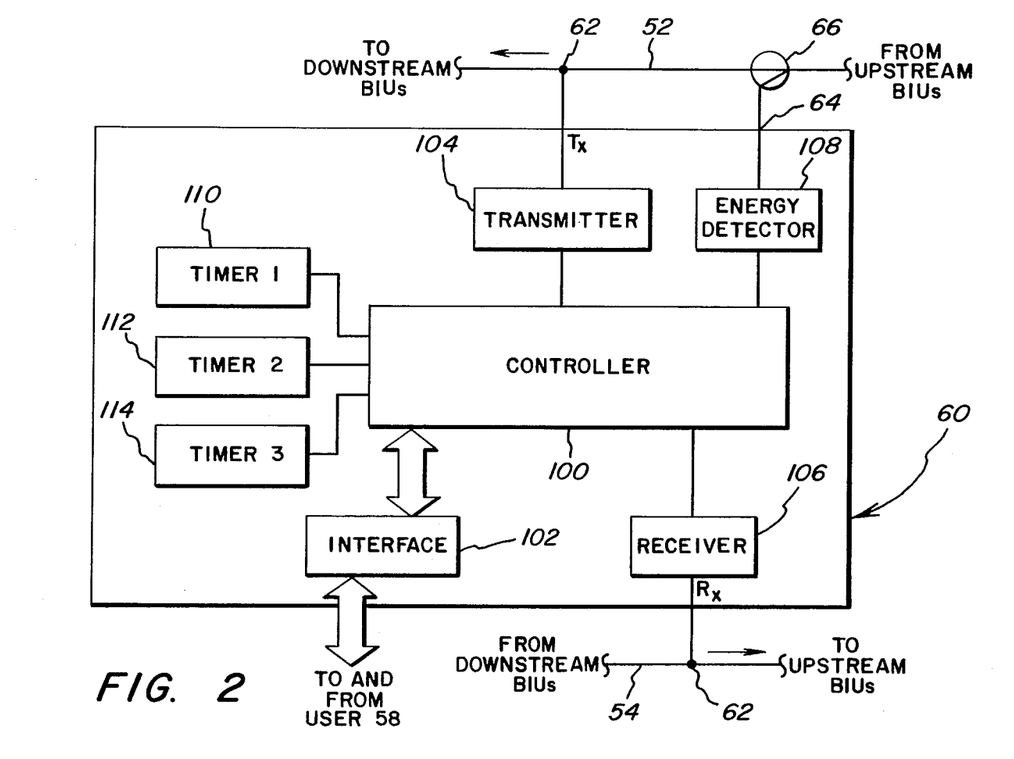
FIG. 2 is a block diagram of a BIU illustrated in FIG. 1.

A preferred BIU 60 is illustrated in FIG. 2. Each BIU 60 comprises a controller 100 coupled through an interface 102 for communication with its respective user terminal 58 (not shown). Controller 100 comprises any element, or combination of elements, capable of controlling the transfer of information between user terminal 58, transmit bus 52 and receive bus 54. For example, controller 100 may comprise a microprocessor for controlling the transfer of information between user terminal 58 and BIU 60, as well as for controlling the transfer of information between the BIU, the transmit bus and the receive bus. The microprocessor would be programmed, by methods and apparatus known in the art, to implement the methods described herein for information transfer between user terminals 58 via transmit bus 52 and receive bus 54. Controller 100 may additionally comprise read only memory, random access memory, timers, latches, comparators, bistables and/or monostables, etc., as may be necessary for adapting the microprocessor for such information transfer.

Interface 102 periodically receives information messages from user terminal 58 for transmission on transmit bus 52. The interface performs the above-described function of forming information packets from these messages and then stores the packets for later transmission when the BIU gains access to the transmit bus. Similarly, the interface receives, via the controller, information packets received on the receive bus and addressed to the user associated with the BIU. The interface also performs the above-described function of formatting the received packet(s) for transfer to the user terminal. In accordance with the bus accessing method practiced by each BIU as described hereinbelow, various requirements are imposed on the format of an information packet preamble and on the overall length of an information packet. Interface 102 may comprise any device or combination of devices, e.g. registers, ROM, RAM, microprocessors, etc., for formatting, under control of controller 100, the information as required.

Controller 100 is also shown coupled to transmit bus 52 and receive bus 54 via a transmitter 104 and a receiver 106, respectively. Transmitter 104 comprises any device, or combination of devices, capable of transmitting digital information, from controller 100, on the transmission bus. Likewise, receiver 106 comprises any device, or combination of devices, for receiving the digital transmissions directed onto receive bus 104 by head-end 56. For example, transmitter 104 and receiver 106 may each comprise a model 30-0078-3 modem as available from the Computrol Corporation for transmitting and receiving AC modulated digital signals. When the transmit and receive buses comprise the same physical cable, both transmitter 104 and receiver 106 would be coupled between controller 100 and the cable and together comprise a digital transceiver. Alternatively, where the transmit and receive buses comprise fiber optic cables, the transmitter and receiver may respectively comprise a high speed transmitter Model No. HFBR-1001 and a high speed receiver Model No. HFBR-2001, both manufactured by the Hewlett Packard Company.

The BIU also includes an energy detector circuit 108 coupled to directional coupler 66 via energy detect port 64. Energy detector 108 may comprise any device or combination of devices for providing a signal to the controller upon detecting transmission energy, on the transmit bus, originating from an upstream direction. Due to the nature of the coupling factors provided by directional coupler 66, the strength of a signal on the transmit bus originating from the upstream direction will be substantially greater than that of signals originating from the downstream direction. Energy detector 108 therefore need only be sensitive to the presence of signal energy above a level determined by expected signal energy levels on the medium and the above-noted coupling factors.

BIU 60 further includes three timers 110, 112 and 114 for respectively measuring a first, a second and a third time period. The respective durations of the first, second and third time periods are selected in accordance with the bus accessing method, as described more fully below. Each timer initiates measurement of its respective time period upon receipt of an initiating signal from the controller and provides a time-out signal to the controller upon successfully completing measurement of its time period.

A contention type bus accessing method is practiced by the BIUs of network 50 in accordance with the protocol of the present invention. The method therefore allows collisions between the information packets transmitted by BIUs contending for access to the transmission bus. In all cases, of the group of contending BIUs, the one having the most upstream location successfully completes transmission of its information packet. The remaining, unsuccessful contending BIUs each enter a preempted state and subsequently transmit their respective information packets in an order according to their serial positions along the transmit bus from upstream to downstream. This order is determined, in accordance with the protocol of the present invention, without the need for a communication period, as required in the Preemptive BID system, following the packet transmission of each preempted BIU and results in the information packets of the preempted BIUs being transmitted in a sequence such that the respective packets are separated from one another by a first silent period having a predetermined duration, hereinafter referred to as "B" microseconds. This is achieved, in part, by requiring the respective BIUs to measure various time periods, as more fully described below, and by stipulating the form of the information packet preamble such that the preamble includes a gap, having a duration of "B" microseconds, during which no signal is transmitted. It is noted, however, that there is no minimum length requirement for the preamble based on transmission medium length as is the case in the Preemptive BID system described above. The various time period measurements required by the bus accessing method practiced by each BIU also results in the sequences of preempted packets being separated from each other by a second silent period having a predetermined duration greater than "B" microseconds.

Figure 3:
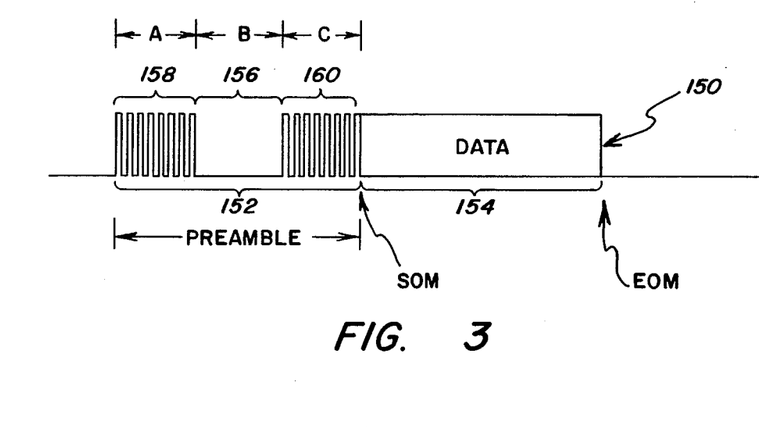
FIG. 3 is an exemplary information packet.

Referring now to FIG. 3, an information packet 150, having a form in accordance with the bus accessing protocol of the present invention, includes a preamble portion 152 and a data portion 154. The preamble includes a gap portion 156 of duration "B" microseconds during which no signal is transmitted. Gap 156 occurs between two remaining portions 158 and 160 of the preamble which have respective durations of "A" and "C" microseconds. The overall length, in microseconds, of the preamble is selected independent of the length of, i.e. propagation delay along, the transmission medium. The length of preamble portion 152 can be shorter than the transmission medium two-way propagation delay. In practice, the relative lengths of medium two-way delay and preamble portion are determined by the physical medium length and the transmission bit rate.

Still referring to FIG. 3, start of message (SOM) is preferably signaled in packet 150 in a manner known in the art and practiced in other contention protocols. SOM is signaled by the sequence: (1) transition from no carrier to carrier, (2) provide a sequence of alternating '0' and '1' bits, and (3) depart from the sequence of alternating '0' and '1' bits, e.g. provide two '1' bits together. Thus, in the case of packet 150, the transition from gap 156 to portion 160 provides the transition from no carrier to carrier. Portion 160 is required to consist of alternating '0' and '1' bits and concludes with a departure from that sequence, such as two '1' bits. SOM is therefore indicated in FIG. 3 at the end of portion 160 of the preamble. Since the SOM is signaled by the sequence commencing with the gap portion of the preamble, BIUs receiving the information packet must use portion 160 of the preamble for synchronization purposes. As a result, the "C" microsecond duration must be sufficiently long to enable this synchronization.

BIUs receiving information packets also require sufficient time to reset for the receipt of a new packet following receipt of a previous packet or interrupted portion thereof. The "B" microsecond duration of gap 156 is selected to be sufficiently long to enable a BIU to reset for this purpose. The "A" microsecond duration of portion 158 of the preamble is discussed below. In a network in which signals are transmitted at a 10 Mbit/second bit rate, the "A", "B", and "C" microsecond durations may take on the exemplary values of 10, 10 and 12 microseconds, respectively. The values of "A", "B", and "C" generally vary in inverse proportion to the bit rate.

It is preferred herein that end of message (EOM) be signaled, as in other contention protocols, by a drop in the carrier. The protocol of the present invention assures that a sufficiently long period during which no signal is transmitted, follows each information packet. The creation of this period is described more fully below. EOM is therefore indicated in FIG. 3 at the end of information packet 150.

Figure 4:
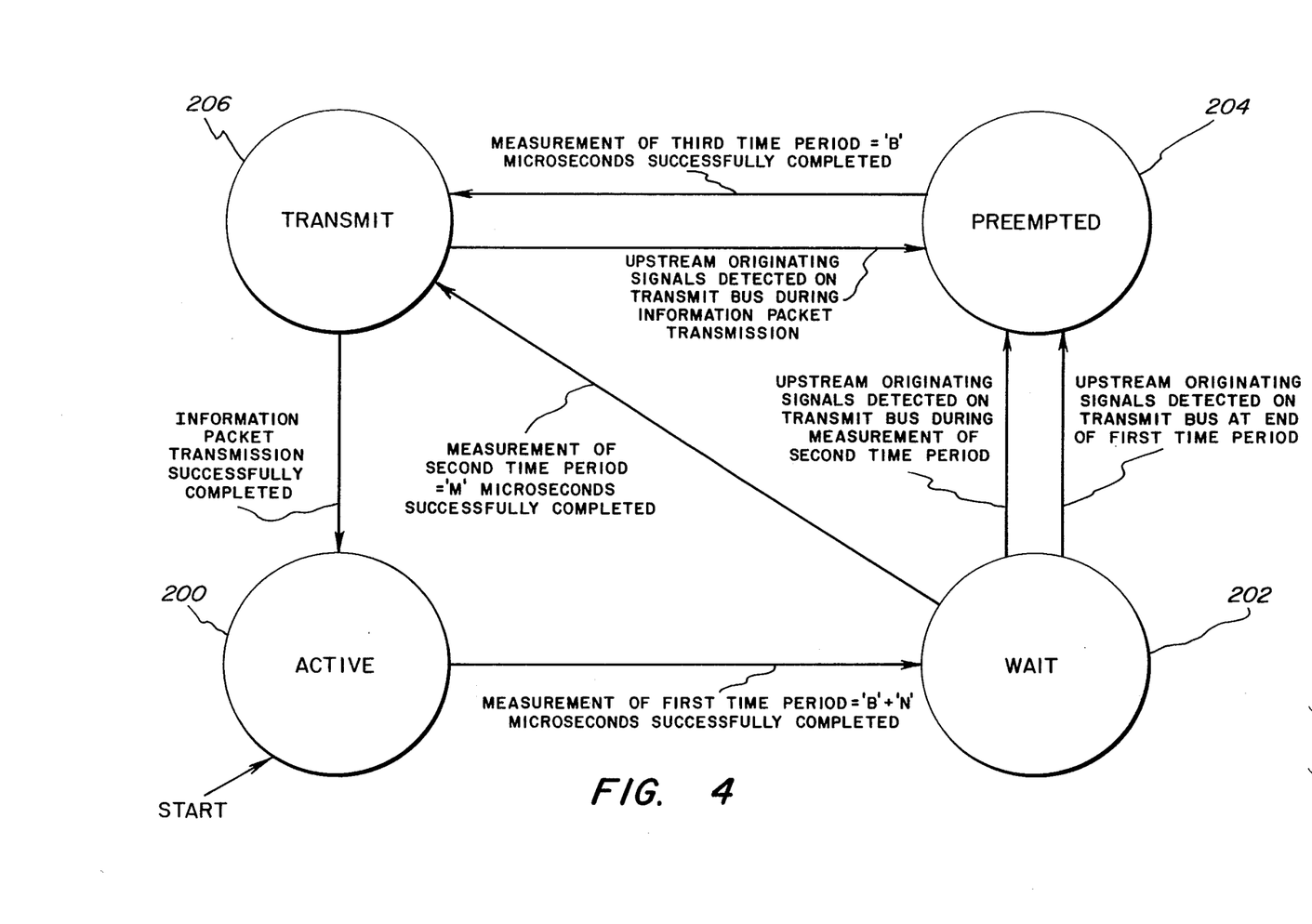
FIG. 4 is a state diagram illustrating operation of a BIU in accordance with the present invention.

Referring to FIG. 4 which is a state diagram of BIU 60, in operation, each BIU may assume an active state 200, a wait state 202, a preempted state 204 or a transmit state 206. The BIU starts in the active state 200, when it has an information packet to transmit, in which it monitors the receive bus via its receiver 106 (FIG. 2) for the presence of signals. It commences measurement of the first time period upon determining there is no signal on the receive bus. Thus, controller 100 (FIG. 2) of the BIU initiates operation of timer 110 after determining it has an information packet for transmission and further determining there is no signal being received by receiver 106. The duration of the first time period is "B"+"N" microseconds where "B" is as previously defined and "N" is a first tolerance period added to "B" to assure that measurement of the first time period cannot be successfully completed by sensing the absence of signal during gap 156 of the preamble of a packet propagating along the receive bus. An exemplary value of "N" is 30–40% of the "B" microsecond duration. As more fully described below, the packets of BIUs in the preempted state are transmitted in a sequence with the first silent period of "B" microseconds separating the respective packets. Thus, an active state BIU will be unable to successfully complete measurement of the first time period upon detecting the "B" microsecond first silent periods in this packet sequence.

If a signal is detected on the receive bus while the first time period is being measured, the controller ceases the measurement, resets timer 110 and continues to monitor the receive bus until no signal is detected thereon. When no receive bus signal is detected, measurement of the first time period is started anew. This process is continued until the measurement of the first time period is successfully completed.

Upon successful completion of the first time period measurement, the BIU transitions to the wait state and determines whether any upstream originating signals are present on the transmit bus. Controller 100 determines this by means of energy detector 108. If upstream originating signals are present on the transmit bus, the BIU immediately transitions to the preempted state. If such signals are not present, the controller initiates operation of timer 112 to commence measurement of the second time period. Alternatively, and with equal effectiveness, the BIU upon transitioning to the wait state, could simultaneously both determine whether upstream signals are present and initiate the second time period measurement. If an upstream originating signal is detected, by energy detector 108, on the transmit bus at any time during measurement of the second time period, the controller ceases that measurement and the BIU transitions to the preempted state. The duration of the second time period is "M" microseconds where "M" is a second tolerance period, the purpose of which is more fully described below. An exemplary value of "M", which corresponds to the exemplary values for "A", "B", "C" and "N" provided above, is on the order of 30–40% of the "B" microsecond duration.

Upon successful completion of the second time period measurement, the BIU transitions to the transmit state in which it commences transmission of its information packet. If during packet transmission, an upstream originating signal is detected on the transmit bus, controller 100 immediately ceases the transmission and the BIU transitions to the preempted state. If, instead, the BIU successfully completes transmission of its information packet, it reverts to the active state.

As described above, the BIU transitions to the preempted state, from either the transmit or wait states upon detecting upstream originating signals on the transmit bus. The BIU remains in the preempted state continuing to monitor the transmit bus. When a cessation of the upstream signals is detected, the controller initiates operation of timer 114 to commence measurement of the third time period. The third time period has a duration of "B" microseconds. If energy detector 108 detects signals before completion of the third time period measurement, the controller ceases that measurement, resets timer 114 and continues to monitor the transmit bus via the energy detector. The third time period measurement is commenced anew upon the next cessation of upstream originating signals on the transmit bus. This process is continued until measurement of the third time period is successfully completed at which time the BIU transitions to the transmit state wherein it commences information packet transmission as described above.

The operation of network 50 resulting from the individual BIUs operating in accordance with the states described above, is best illustrated by means of an example. It is assumed BIUs 60-1, 60-2, 60-3 and 60-N have received from their respective users 58, information for transmission. Thereafter, at respectively different times determined by when the information was so received, each BIU detects the absence of signals on the receive bus and commences measurement of the first time period. BIUs 60-1, 60-3 and 60-N successfully complete measurement of the first and second time periods, respectively enter the transmit state and each begin transmitting an information packet. It is assumed BIU 60-2 commenced measurement of the first time period later than BIU 60-3 and upon entering the wait state, detected on the transmit bus the presence of the packet already being transmitted by BIU 60-3 which is located upstream with respect thereto. BIU 60-2 therefore transitioned directly to the preempted state without transitioning to the transmit state.

Continuing description of the example, FIGS. 5A, 5B, 5C and 5D are diagrammatic illustrations of transmit bus 52 at succeedingly later points in time so that the progress, along that bus, of the information packets transmitted by BIUs 60-1, 60-3, and 60-N can be described. The downstream end of the transmit bus, the entire receive bus, the head-end and BIU 60-2 are omitted from FIG. 5 for clarity. Note that in practice, couplers 62 and 66 of each BIU are coupled to the transmit bus at substantially the same location and are only shown spaced apart on the transmit bus, in the Figures, for illustrative purposes. As a result, an upstream originating packet which causes a downstream BIU to cease transmission, will substantially abut the latter BIU's packet at the point where its transmission was ceased. Note further that since FIGS. 5A through 5D are diagrammatic only and not to scale, the representation of information packets on the transmit bus is not intended to imply actual lengths of packet portions relative to the spacing between BIUs.

Figure 5A:
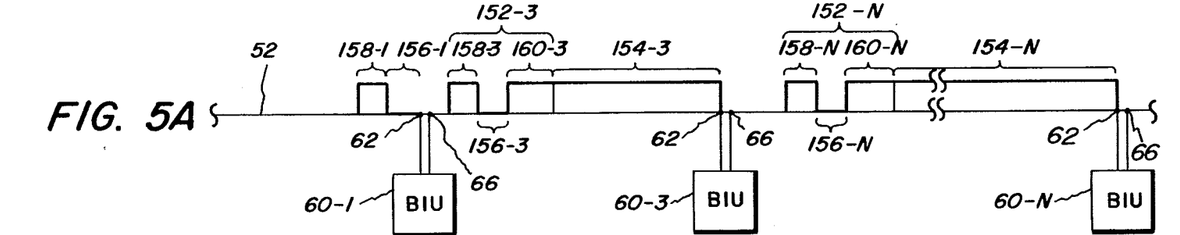
FIGS. 5A, 5B, 5C and 5D are illustrations of information packets propagating along the network transmit bus at respectively later points in time.

Referring to FIG. 5A, the portions of the respective information packets transmitted by the BIUs are indicated by the reference numerals which include a hyphenated number suffixed thereto corresponding to the BIU which transmitted the packet. For example, preamble portions 158-3, 156-3 and 160-3 and data portion 154-3 all comprise the information packet being transmitted by BIU 60-3. Only so much of each information packet as has been transmitted at the point in time to which FIG. 5A corresponds is shown. BIU 60-1 has transmitted portion 158-1 of its preamble and is in the process of transmitting gap portion 156-1. It has not yet detected the upstream originating packet transmitted by BIU 60-3. BIU 60-3 has transmitted the entire preamble 152-3 of its packet and is in the process of transmitting data portion 154-3. It has not yet detected the packet transmitted by BIU 60-N.

Figures 5B, 5C:
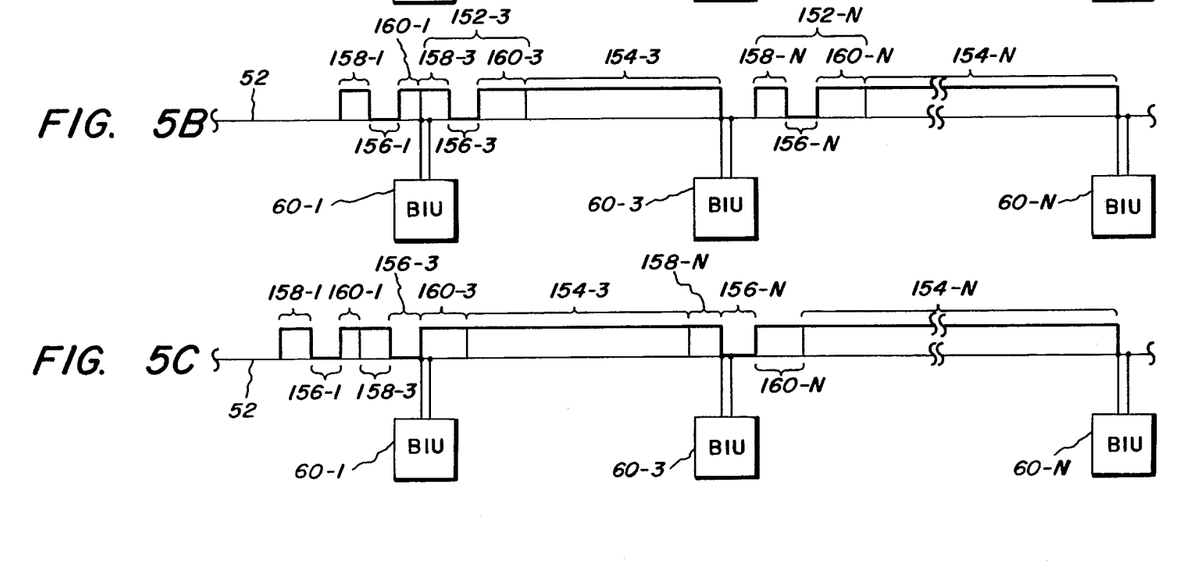

FIG. 5B illustrates transmit bus 52 at a point in time later than in FIG. 5A. Preamble portion 158-3 has been detected by BIU 60-1 which in response has immediately ceased transmission of its information packet. Preamble portion 158-3 therefore substantially abuts preamble portion 160-1 which BIU 60-1 was in the process of transmitting when it ceased transmission. As discussed above, upon ceasing transmission, BIU 60-1 transitions to the preempted state. Referring still to FIG.

5B, although the packet transmitted by BIU 60-N has further advanced along the transmit bus, it has still not reached BIU 60-3. Therefore, BIU 60-3 continues transmission of the data portion of its information packet.

Referring to FIG. 5C which illustrates the transmit bus at a point in time later than illustrated in FIG. 5B, the preamble of the packet transmitted by BIU 60-3 propagates past BIU 60-1 with the portion of the latter BIU's preamble abutted thereto. BIU 60-3, while transmitting data portion 154-3 of its packet, detected the presence of the packet being transmitted by BIU 60-N and ceased transmission of its own packet. BIU 60-3, upon ceasing transmission, transitioned to the preempted state. BIU 60-N will successfully complete transmission of its information packet, since it is the most upstream of the BIUs that contended for access to transmit bus 52.

As described above, the respective preamble portions 158 of the packets transmitted by BIUs 60-3 and 60-N respectively caused BIUs 60-1 and 60-3 to cease transmission. Also as described above, the preamble portion 158 became substantially abutted to the information packet the transmission of which was ceased. This illustrates the purpose of preamble portion 158. It is intended to cause the downstream BIUs which it encounters to cease measurement of the second time period or cease transmission and transition to the preempted state. Further, portion 158 carries no substantive information and is expected to be damaged by its collision with another packet. The speed with which the downstream BIU ceases transmission upon detecting the upstream originating preamble portion 158 determines the minimum required length, i.e. "A" microseconds, of this portion. It is preferred herein that the "immediate" cessation of transmission by the downstream BIU occur within a minimum number of bit times so that the length required of preamble portion 158 is minimized. Note, however, that the "A" microsecond length should be sufficient so that the downstream BIU has truly ceased transmission when gap portion 156 immediately behind portion 158 arrives at coupler 62 of the downstream BIU.

Figure 5D:
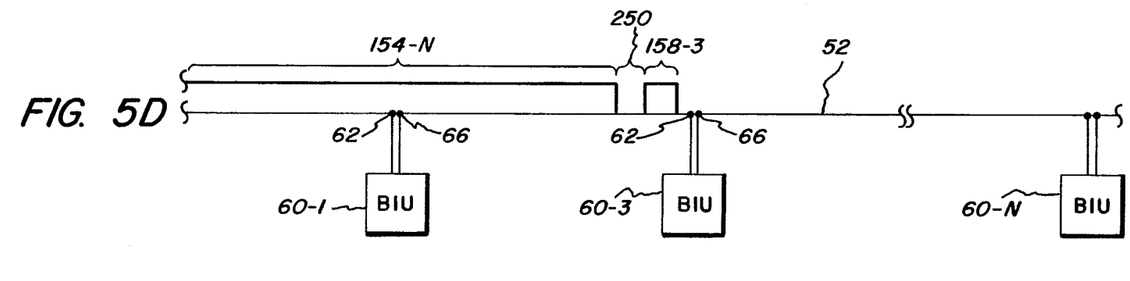

Still continuing with the example, BIUs 60-1, 60-2 and 60-3 are in the preempted state and are therefore monitoring the transmit bus in order to detect the cessation of the upstream originating signals. BIU 60-3 being upstream with respect to BIUs 60-1 and 60-2 will detect the end of the packet transmitted by BIU 60-N and commence measurement of the third time period. Since no other BIUs are transmitting from an upstream direction with respect to BIU 60-3, that BIU will successfully complete measurement of the third time period, transition to the transmit state and commence transmission of its own information packet. Since the duration of the third time period is "B" microseconds, the first silent period of "B" microsecond duration will ensue between the end of the packet transmitted by BIU 60-N and the preamble of the packet transmitted by BIU 60-3. This is illustrated in FIG. 5D wherein BIU 60-3 has commenced transmission of its packet, having so far transmitted preamble portion 158-3 and part of gap 156-3. The first silent period, designated 250, ensues between the end of data portion 154-N and preamble portion 158-3. BIUs 60-1 and 60-2 remain in the preempted states since they are unable to successfully complete measurement of the third time period. BIU 60-2 and later BIU 60-1 will each gain access to the transmit bus upon measuring the third time period following the ends of the packets transmitted by BIUs 60-3 and 60-2, respectively. Thus, in general, the preempted state BIUs gain access to the bus in an order according to their serial positions along the transmit bus from upstream to downstream. Further, the group of BIUs that initially contended for access to the bus, i.e. BIU 60-N and the preempted state BIUs, transmit their respective information packets in a sequence with the individual packets being separated from one another by the first silent period of "B" microseconds.

It is noted that since the first silent period and gap 156 are each equal in duration to the third time period, a preempted state downstream BIU may successfully complete measurement of the third time period during the first silent period and/or gap 156. If this occurs, the downstream BIU may commence transmission for a very brief period before detecting the upstream originating signals and ceasing transmission. As a result, damage to part of the preamble would occur. Such damage would be of no significance with respect to preamble portion 158 since, as discussed above, this preamble portion is expected to incur such damage. If the transmission commences at the end of gap 156, the first few bits of portion 160 may be damaged. For this reason, the "C" microsecond duration of preamble portion 160 is chosen to be long enough so that a sufficient length of undamaged preamble remains to enable synchronizing by the receiving BIUs.

It is further noted that as the series of signals commencing with the portion of the packet transmitted by the most downstream preempted BIU propagates along the receive bus, each active state BIU detecting its presence can no longer complete measurement of the first time period. It is noted that a limiting case can occur in which an active state BIU, downstream with respect to a transmitting BIU, e.g. BIU 60-N, completes measurement of the first time period just prior to detecting the preamble of the transmitted packet, e.g. portion 158-N, on the receive bus and transitions to the wait state. It will then transition to the preempted state, however, since it will detect the presence of the information packet on the transmit bus as an upstream originating signal. Thus, the total number of preempted state BIUs is limited. Further, the information packets of the preempted state BIUs are transmitted in the above described sequence immediately following the successful transmission of the most upstream BIU, there being "B" microseconds ensuing between the packets of the sequence. As a result, BIUs in the active state, including BIUs previously in the preempted state that have successfully completed packet transmission, monitor a succession of signals on the receive bus which intermittently include first silent periods and preamble gaps of "B" microseconds, which is less than the first time period. Therefore, all preempted state BIUs are free to transmit their respective information packets without any contention from active state BIUs.

Following transmission of the packet sequence by the preempted state BIUs, the contention process is repeated. In general, the second silent period following each sequence of packets has a duration in no case less than the sum of the first and second time periods. This is so since no active state BIU will successfully complete measurement of the first time period until it detects an absence of signals on the receive bus for a duration of "B"+"N" microseconds. Note, however, that the duration of the second silent period is still shorter than the communication period following the last preempted BIU packet in the Preemptive BID system. Further, in practicing the bus accessing method of the present invention, preempted state BIUs gain access to the transmit bus without each having to undergo a repetitive cycle of communication periods, as in the Preemptive BID system. Instead, the shorter "B" microsecond first silent period ensues between their respective packets. Additionally, each BIU upon successfully completing transmission of its packet immediately reverts to the active state and need not measure a captive period, as in the Preemptive BID system, before attempting to gain bus access. Yet further, the preamble of information packet 150 can be shorter than the medium two-way delay required by the Preemptive BID system. Thus, in these respects, the present invention serves to greatly improve the effective data rate of the transmission medium over that resulting from practice of the Preemptive BID protocol.

With respect to the bus accessing protocol thus far described, it is preferred that information packet 150 have a duration at least equal to the sum of the two-way propagation delay of "2T" microseconds along the transmit and receive buses (including the head-end amplifier), +"B"+"M" microseconds. Thus, "2T" can be viewed as the propagation delay along the transmission medium from the transmit port to the receive port of BIU 60-N. This minimum packet length is stipulated to avoid the loss of transmitted packets in the case where two BIUs are located close to one another and at or near the upstream end of the transmission medium. For example, consider the most upstream BIU 60-N and a BIU 60-[N-1] located immediately adjacent to BIU 60-N on the downstream side thereof. The critical case occurs when BIU 60-[N-1] is near completion of a packet transmission and BIU 60-N has a packet to transmit. BIU 60-N could commence transmission of its packet just as BIU 60-[N-1] completes its transmission. The signal free period of insufficient duration, i.e. less than "B" microseconds, between the two packets would result in the downstream packet (e.g. that transmitted by BIU 60-[N-1]) being damaged without this fact being detected by the transmitting BIU. Due to the insufficient duration of the signal free period, required for determination of EOM, receiving BIUs cannot properly determine the end of the downstream packet and, therefore, that packet is unreceivable by the other BIUs in the network. Further, the fact that the packet is unreceivable is unknown to the downstream BIU (e.g. BIU 60-[N-1]). In accordance with the protocol described above, BIU 60-N should either commence transmitting so as to cause BIU 60-[N-1] to cease transmission (and enter the preempted state) or be prevented from leaving the active state by detecting the packet being transmitted by BIU 60-[N-1] on the receive bus.

If information packets have a duration of "2T"+"B"+"M" microseconds, the preamble of the packet being transmitted by BIU 60-[N-1] is being detected on the receive bus by BIU 60-N, while BIU 60-[N-1] has at least another "B"+"M" microseconds of packet still to transmit. Thus, at this instant, if BIU 60-N has not successfully completed measurement of the first time period, it will thereafter be prevented from leaving the active state until the transmissions of BIU 60-[N-1] and any preempted BIUs are completed. If, however, at this instant, BIU 60-N has just successfully completed measurement of the first time period, it will transition to the wait state, and commence measurement of the second time period of "M" microseconds. It will successfully complete this measurement, since there are no upstream BIUs with respect thereto, and commence transmitting. However, at the time BIU 60-N commences transmission, BIU 60-[N-1] still has "B" microseconds of information packet still to transmit and a collision will occur. BIU 60-[N-1] will cease transmission and transition to the preempted state. Thus, the stipulated packet length assures no undetected packet loss, as in the situation described above.

The need for the second time period may now be more readily understood. A downstream active state BIU, e.g. BIU 60-1, would be the first to commence measurement of the first time period upon detecting the end of a sequence of preempted state BIU packets. If the downstream BIU commenced transmission of a new information packet following successfully completing measurement of the first time period only, the second silent period ensuing between the end of the sequence and the preamble of the new packet would be on the order of the first time period, i.e. "B"+"N" microseconds. Due to operating tolerances, BIUs further upstream might not successfully complete measurement of the first time period and therefore remain in the active state. An unfair advantage to the downstream BIU would therefore result. Requiring time out of the second time period, having the second tolerance period duration of "M" microseconds, assures a sufficiently long second silent period following the end of the packet sequence so that upstream active state BIUs have the opportunity to successfully complete measurement of the first time period.

Figure 6:
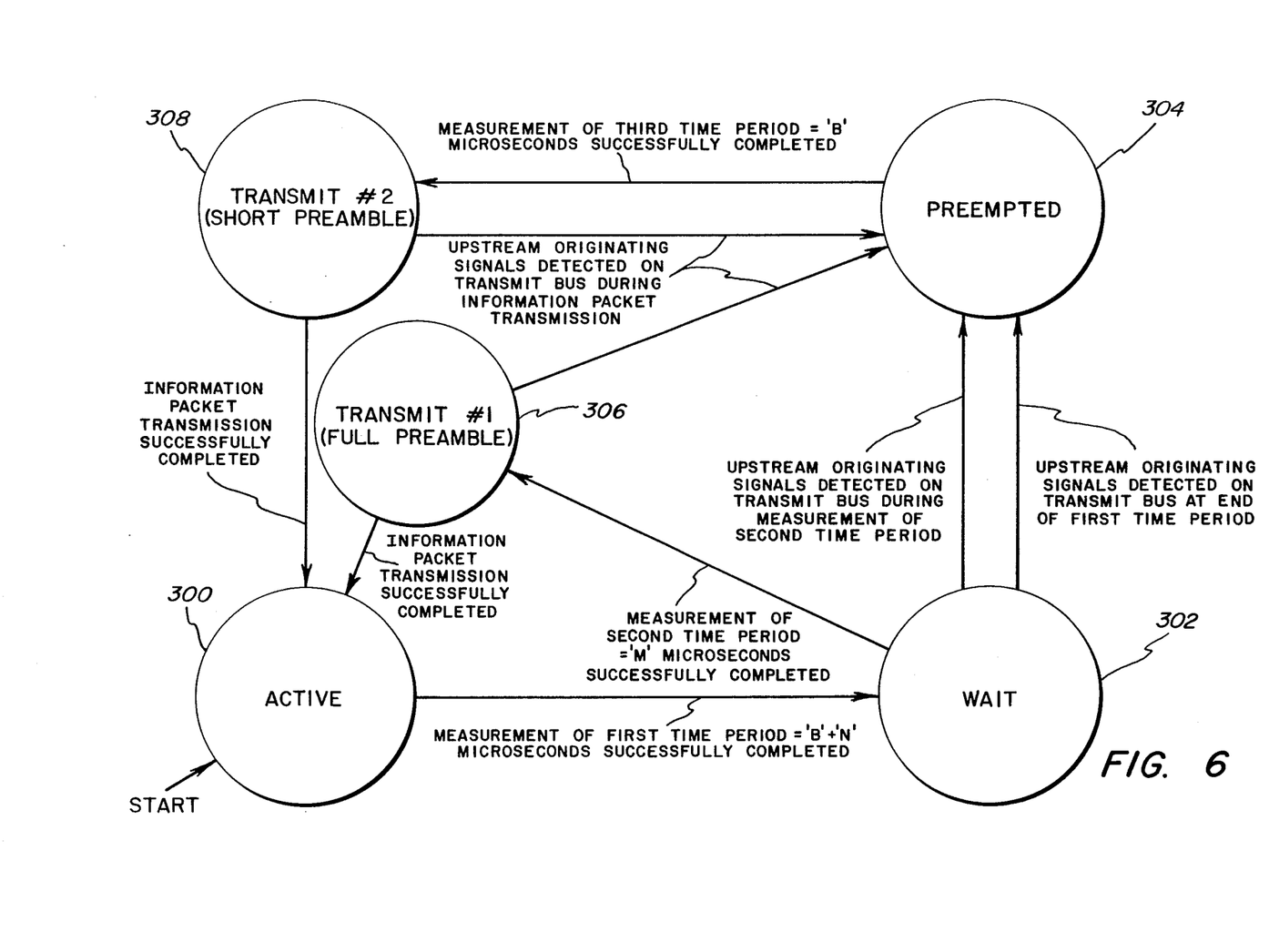
FIG. 6 is a state diagram illustrating operation of a BIU in accordance with an alternate embodiment of the present invention.

In an alternate embodiment of the present invention, BIUs in the preempted state transmit information packets that have a preamble consisting only of portion 160, i.e. preamble portions 156 and 158 are dispensed with. This is possible since measurement of the third time period by each preempted state BIU, prior to transmission thereby, assures a gap having a duration "B" microseconds (=third time period) between the respective information packets in the sequence of packets transmitted by the preempted state BIUs. FIG. 6 is a state diagram of a BIU following the bus accessing method in accordance with the alternate embodiment of the present invention. Each BIU can be in an active state 300, a wait state 302, a preempted state 304, a transmit #1 state 306 or a transmit #2 state 308. The active, wait and transmit #1 states are substantially identical to the active, wait and transmit states, respectively, described above with respect to FIG. 4. Thus, the BIU transitions to preempted state 304 from the transmit #1 state or the wait state under exactly the same conditions as described with respect to FIG. 4 for the transmit or wait states therein, respectively. In the transmit #1 state, the BIU commences transmission of an information packet having a full preamble as illustrated in FIG. 3 and described in detail above. A BIU in preempted state 304 attempts to successfully measure the third time period upon detecting an absence of upstream originating signals on the transmit bus. Upon successfully completing the third time period measurement, the preempted state BIU transitions to the transmit #2 state in which it commences transmission of an information packet having a short preamble, i.e. a preamble consisting only of portion 160. Note that the preempted state BIU cannot transition to the transmit #1 state. If, while transmitting in the transmit #2 state, upstream originating signals are detected on the transmit bus, the BIU ceases transmission and reverts to the preempted state. Upon successfully completing transmission of the information packet with short preamble, the BIU reverts from the transmit #2 state to the active state.

Operation of network 50 in accordance with the alternate embodiment still results in the packet successfully transmitted by the most upstream BIU having a full preamble. This full preamble packet is followed by a sequence of preempted state BIU packets each with the short preamble and separated from one another, and the full preamble packet, by the first silent period of "B" microseconds. As discussed above, "B" microseconds is a sufficient signal free duration for receiving BIUs to reset for receipt of a new information packet. The duration of preamble portion 160 remains unchanged since it still serves the function of enabling synchronization by the receiving BIUs. Thus, network operation in accordance with the alternate embodiment reduces total transmission time by shortening the preambles of packets transmitted by BIUs which have transitioned to the preempted state.

It is noted that in practicing the protocol of the alternate embodiment, only the full preamble packet, successfully transmitted by the BIU in the transmit #1 state, need have an overall length equal to or greater than the minimum length previously discussed, i.e. "2T""B"+"M" microseconds. The packets transmitted by BIUs in the transmit #2 state, can be shorter in length. This is so since the transmit #2 state packets follow immediately behind the transmit #1 state packet, it is only required that the "B" microsecond first silent period ensue between the respective transmit #2 state packets, irrespective of their individual lengths, so that receiving BIUs can reset for receipt of each succeeding packet in the sequence.

With respect to the protocol of the present invention as illustrated in FIGS. 4 or 6, it is clearly less complex and therefore easier to implement as compared to the Preemptive BID protocol. Thus, in conjunction with the effective data rate improvements discussed above, the protocol of the present invention affords a significant improvement over the Preemptive BID system.

A priority scheme can be introduced into the operation of the network 50 BIUs irrespective of whether the BIUs are characterized by the state diagram of FIG. 4 or FIG. 6. In accordance with the priority scheme, an information packet is assigned a high, a normal, or a low priority. A normal priority packet is treated as described above in accordance with the appropriate state diagram. A BIU having a high priority packet for transmission, immediately transitions to the wait state without measuring the first time period. The BIU then operates in accordance with the methods described above. With respect to a low priority packet, the BIU operates in accordance with the appropriate state diagram except that the value of "N" in the first time period is increased. The amount by which "N" is increased may alternatively be viewed as a fourth time period which must time out after the first time period before the BIU transitions to the wait state. Operation in accordance with the priority scheme therefore results in a BIU having a high priority packet to transmit gaining access to the bus more quickly than a BIU having a normal or low priority packet to transmit. A BIU having a low priority packet to transmit will wait longer to gain transmit bus access than a BIU having a high or normal priority packet to transmit.

While the embodiments of the present invention disclosed herein describe BIUs each gaining access to the transmit bus to transmit a single information packet, the invention is not so limited. Each BIU may be enabled to form for transmission a composite information packet from a plurality of short packets. In such a case, the preamble at the head of the composite packet would have to conform to the requirements discussed above. However, each short packet, within the composite packet, following thereafter would only require a preamble portion 160 and be delayed behind the immediately succeeding short packet by "B" microseconds. The overall length of the composite information packet would be subject to limitation in the interest of maintaining fairness among the BIUs with respect to bus access.

The bus accessing protocol of the present invention as described above includes a minimum length requirement for at least some information packets. This minimum length requirement may be dispensed with if, instead, each transmit state BIU upon successfully completing transmission of its information packet waits an additional "B" microseconds during which it monitors the transmit bus. If during this post transmission period the BIU detects upstream originating signals on the transmit bus, it reverts to the preempted state. Otherwise, it reverts to the active state. This post transmission period successfully obviates occurrence of the problem discussed above with respect to establishing a minimum packet length.

In accordance with the bus accessing protocol of the present invention, each BIU measures a second time period, "M" microseconds, this being required to assure that downstream BIUs do not gain access to the transmission medium in a manner which precludes access by upstream BIUs. Measurement of the second time period may, however, be dispensed with. In its place, to avoid the access preclusion problem, each BIU gaining access to the transmit bus immediately after successfully completing packet transmission must wait a period of "B"+"M"+"N" microseconds before commencing a subsequent transmission. This ensures that the space between these packets will be at least "B"+"M"+"N" microseconds long, thereby allowing upstream BIUs to transition out of the active state.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A communication network, comprising:
   a transmit bus;
   a receive bus;
   means for directing signals leaving said transmit bus onto said receive bus;
   a plurality of bus interface units (BIU) respectively coupled between said transmit and receive buses at locations spaced therealong, said BIUs communicating with one another by transmitting and receiving signals on said transmit and receive buses respectively, each said BIU being coupled to a user device for which it both transmits and receives information packets;
   each said BIU including:

means for detecting signals on said transmit bus originating from an upstream direction away from said directing means;

means for detecting signals on said receive bus; and means for measuring the respective durations of a first, a second, and a third time period;

each said BIU having an information packet to transmit being in an active state and initiating measurement of said first time period upon detecting the absence of receive bus signals, said BIU in said active state ceasing the first time period measurement upon subsequently detecting receive bus signals and reinitiating the first time period measurement only when the receive bus signals cease;

said BIU transitioning from said active state to a wait state upon successfully completing the first time period measurement and then initiating measurement of said second time period;

said BIU ceasing the second time period measurement upon detecting said upstream signals and transitioning from said wait state to said preempted state;

said BIU in said wait state upon successfully completing the second time period measurement transitioning to a transmit state in which it commences transmission of its information packet;

said BIU ceasing transmission upon detecting said upstream signals and transitioning from said transmit state to said preempted state;

said BIU in said preempted state initiating measurement of said third time period upon detecting cessation of said upstream signals, said BIU ceasing the third time period measurement upon detecting said upstream signals and reinitiating the third time period measurement only upon the subsequent cessation of said upstream signals;

said BIU in said preempted state transitioning to said transmit state upon successfully completing the third time period measurement; and said BIU in said transmit state reverting to said active state upon successfully completing transmission of its information packet.

2. The communication network of claim 1 wherein each said information packet includes a preamble having a gap portion during which no signal is transmitted, said preamble gap having a duration selected to enable each said BIU receiving said information packet including said gap to reset for receipt of a new packet.

3. The communication network of claim 2 wherein said information packet has a duration that exceeds a total signal propagation delay along said transmit and receive buses by at least the sum of said second and third time periods.

4. The communication network of claim 2 wherein the duration of said first time period is equal to the sum of the duration of said preamble gap and a first predetermined tolerance period, so that said BIU in said active state cannot successfully complete the first time period measurement upon detecting on said receive bus said preamble gap in the information packet transmitted by another BIU.

5. The communication network of claim 4 wherein the duration of said third time period is substantially equal to the duration of said preamble gap;

a group of said BIUs each in said active state and successfully transitioning to said wait state, only the most upstream BIU in said group successfully both transitioning to said transmit state and completing transmission of its information packet, the remaining BIUs in said group transitioning to said preempted state from which they respectively transition to said transmit state and successfully complete information packet transmission in an order according to their serial positions along said transmit bus from upstream to downstream; and a first silent period equal to said third time period separating the respective information packets in a sequence of packets successfully transmitted by said group, so that said BIUs in said active state are unable to successfully complete measurement of said first time period upon detecting on said receive bus said first silent period separating the respective information packets in said packet sequence.

6. The communication network of claim 5 wherein the duration of said second time period is equal to a second predetermined tolerance period; and a second silent period following a last information packet in said packet sequence and having a duration at least equal to the sum of said first and second time periods;

whereby BIUs in said active state can successfully complete measurement of said first time period upon detecting said second silent period following the last information packet in said packet sequence.

7. The communication network of claim 1 wherein said information packets are each assigned a high, a normal, or a low priority;

said BIU in said active state having said high priority packet to transmit, transitioning to said wait state without measuring said first time period; and said BIU in said active state having said low priority packet to transmit initiating measurement of a fourth time period following completion of the first time period measurement and transitioning to said wait state only upon successfully completing the fourth time period measurement.

8. A communication network, comprising:

a transmit bus;

a receive bus;

means for directing signals leaving said transmit bus onto said receive bus;

a plurality of bus interface units (BIU) respectively coupled between said transmit and receive buses at locations spaced therealong, said BIUs communicating with one another by transmitting and receiving signals on said transmit and receive buses respectively, each said BIU being coupled to a user device for which it both transmits and receives information packets;

said information packets being of a first or a second type, said first type information packet having a first type of preamble, said second type information packet having a second type of preamble shorter in length than said first type preamble, said first type preamble including a gap portion during which no signal is transmitted;

each said BIU including:

means for detecting signals on said transmit bus originating from an upstream direction away from said directing means;

means for detecting signals on said receive bus; and means for measuring the respective durations of a first, a second, and a third time period;

each said BIU having an information packet to transmit being in an active state and initiating measurement of said first time period upon detecting the absence of receive bus signals, said BIU in said active state ceasing the first time period measurement upon subsequently detecting receive bus signals and reinitiating the first time period measurement only when the receive bus signals cease;

said BIU transitioning from said active state to a wait state upon successfully completing the first time period measurement and then initiating measurement of said second time period;

said BIU ceasing the second time period measurement upon detecting said upstream signals and transitioning from said wait state to said preempted state;

said BIU in said wait state upon successfully completing the second time period measurement transitioning to a first transmit state in which it commences transmission of said first type information packet;

said first transmit state BIU ceasing transmission upon detecting said upstream signals and transitioning to said preempted state, said BIU reverting from said first transmit state to said active state upon successfully completing transmission;

said BIU in said preempted state initiating measurement of said third time period upon detecting the cessation of said upstream signals, said BIU in said preempted state ceasing the third time period measurement upon detecting said upstream signals and reinitiating the third time period measurement only upon the subsequent cessation of said upstream signals;

said BIU in said preempted state upon successfully completing the third time period measurement transitioning to a second transmit state in which it commences transmission of said second type information packet; and said BIU in said second transmit state ceasing transmission upon detecting said upstream signals and transitioning to said preempted state, said BIU reverting from said second transmit state to said active state upon successfully completing transmission.

9. The communication network of claim 8 wherein said preamble gap in said first type preamble has a duration selected to enable each said BIU receiving said first type information packet to reset for receipt thereof.

10. The communication network of claim 9 wherein the duration of said first time period is equal to the sum of the duration of said preamble gap and a first predetermined tolerance period, so that said BIU in said active state cannot successfully complete the first time period measurement upon detecting on said receive bus the preamble gap in said first type information packet transmitted by another BIU.

11. The communication network of claim 10 wherein the duration of said third time period is substantially equal to the duration of said preamble gap;

a group of said BIUs each in said active state and successfully transitioning to said wait state, only the most upstream BIU in said group successfully both transitioning to said first transmit state and completing transmission of its information packet, the remaining BIUs in said group transitioning to said preempted state from which they transition to said second transmit state and successfully complete information packet transmission in an order according to their serial positions along said transmit bus from upstream to downstream; and a first silent period equal to said third time period separating the respective information packets in a sequence of packets successfully transmitted by said group, so that said BIUs in said active state are unable to successfully complete measurement of said first time period upon detecting on said receive bus said first silent period separating the respective information packets in said packet sequence.

12. The communication network of claim 11 wherein the duration of said second time period is equal to a second predetermined tolerance period; and a second silent period following a last information packet in said packet sequence and having a duration at least equal to the sum of said first and second time periods;

whereby BIUs in said active state can successfully complete measurement of said first time period upon detecting said second silent period following the last information packet in said packet sequence.

13. The communication network of claim 8 wherein said information packets are each assigned a high, a normal, or a low priority;

said BIU in said active state having said high priority packet to transmit, transitioning to said wait state without measuring the first time period; and said BIU in said active state having said low priority packet to transmit initiating measurement of a fourth time period following completion of the first time period measurement and transitioning to said wait state only upon successfully completing the fourth time period measurement.

14. The communication network of claim 8 wherein said first type information packet has a duration that exceeds a total signal propagation delay along said transmit and receive buses by at least the sum of said second and third time periods.

15. A bus interface unit (BIU) for a communication network, said network including a transmit bus, a receive bus and means for directing signals leaving said transmit bus onto said receive bus;

a plurality of said BIUs respectively coupled between said transmit and receive buses at locations spaced therealong, said BIUs communicating with one another by transmitting and receiving signals on said transmit and receive buses respectively, each said BIU being coupled to a user device for which it both transmits and receives information packets;

said BIU including:

means for detecting signals on said transmit bus originating from an upstream direction away from said directing means;

means for detecting signals on said receive bus; and means for measuring the respective durations of a first, a second, and a third time period;

said BIU being in an active state when it has an information packet to transmit and initiating measurement of said first time period upon detecting an absence of receive bus signals, said BIU in said active state ceasing the first time period measurement upon subsequently detecting receive bus signals and reinitiating the first time period measurement only when the receive bus signals cease;

said BIU transitioning from said active state to a wait state upon successfully completing the first time period measurement and then initiating measurement of said second time period;

said BIU ceasing the second time period measurement upon detecting said upstream signals and transitioning from said wait state to said preempted state;

said BIU in said wait state upon successfully completing the second time period measurement transitioning to a transmit state in which it commences transmission of its information packet;

said BIU ceasing transmission upon detecting said upstream signals and transitioning from said transmit state to said preempted state;

said BIU in said preempted state initiating measurement of said third time period upon detecting cessation of said upstream signals, said BIU in said preempted state ceasing the third time period measurement upon detecting said upstream signals and reinitiating the third time period measurement only upon the subsequent cessation of said upstream signals;

said BIU in said preempted state transitioning to said transmit state upon successfully completing the third time period measurement; and said BIU in said transmit state reverting to said active state upon successfully completing transmission of its information packet.

16. The BIU of claim 15 wherein each said information packet includes a preamble having a gap portion during which no signal is transmitted, said preamble gap having a duration selected to enable each said BIU in said network receiving said preamble gap to reset for receipt of a new packet.

17. The BIU of claim 16 wherein said information packet has a duration that exceeds a total signal propagation delay along said transmit and receive buses by at least the sum of said second and third time periods.

18. The BIU of claim 16 wherein the duration of said first time period is equal to the sum of the duration of said gap and a first predetermined tolerance period, so that said BIU in said active state cannot successfully complete the first time period measurement upon detecting on said receive bus said preamble gap in the information packet transmitted by another BIU.

19. The BIU of claim 18 wherein the duration of said third time period is substantially equal to the duration of said preamble gap;

a group of said BIUs in said network each in said active state and successfully transitioning to said wait state, only the most upstream BIU in said group successfully both transitioning to said transmit state and completing transmission of its information packet, the remaining BIUs in said group transitioning to said preempted state from which they respectively transition to said transmit state and successfully complete information packet transmission in an order according to their serial positions along said transmit bus from upstream to downstream; and a first silent period equal to said third time period separating the respective information packets in a sequence of packets successfully transmitted by said group, so that said BIUs in said active state are unable to successfully complete measurement of said first time period upon detecting on said receive bus said first silent period separating the respective information packets in said packet sequence.

20. The BIU of claim 19 wherein the duration of said second time period is equal to a second predetermined tolerance period; and a second silent period following a last information packet in said packet sequence and having a duration at least equal to the sum of said first and second time periods;

whereby BIUs in said active state can successfully complete measurement of said first time period upon detecting said second silent period following the last information packet in said packet sequence.

21. The BIU of claim 15 wherein each said information packet is assigned a high, a normal, or a low priority;

said BIU in said active state having said high priority packet to transmit, transitioning to said wait state without measuring said first time period; and said BIU in said active state having said low priority packet to transmit initiating measurement of a fourth time period following completion of the first time period measurement and transitioning to said wait state only upon successfully completing the fourth time period measurement.

22. A BIU for a communication network, said network including a transmit bus, a receive bus and means for directing signals leaving said transmit bus onto said receive bus;

a plurality of said BIUs respectively coupled between said transmit and receive buses at locations spaced therealong, said BIUs communicating with one another by transmitting and receiving signals on said transmit and receive buses respectively, each said BIU being coupled to a user device for which it both transmits and receives information packets;

said information packets being of a first or a second type, said first type information packet having a first type of preamble, said second type information packet having a second type of preamble shorter in length than said first type preamble, said first type preamble including a gap portion during which no signal is transmitted;

said BIU including:
means for detecting signals on said transmit bus originating from an upstream direction away from said directing means;

means for detecting signals on said receive bus; and
means for measuring the respective durations of a first, a second, and a third time period;

said BIU being in an active state when it has an information packet to transmit and initiating measurement of said first time period upon detecting the absence of receive bus signals, said BIU in said active state ceasing the first time period measurement upon subsequently detecting receive bus signals and reinitiating the first time period measurement only when the receive bus signals cease;

said BIU transitioning from said active state to a wait state upon successfully completing the first time period measurement and then initiating measurement of said second time period;

said BIU ceasing the second time period measurement upon detecting said upstream signals and transitioning from said wait state to said preempted state;

said BIU in said wait state upon successfully completing the second time period measurement transitioning to a first transmit state in which it commences transmission of said first type information packet;

said BIU ceasing transmission upon detecting said upstream signals and transitioning from said first transmit state to said preempted state, said BIU reverting from said first transmit state to said active state upon successfully completing transmission;

said BIU in said preempted state initiating measurement of said third time period upon detecting cessation of said upstream signals, said BIU in said preempted state ceasing the third time period measurement upon detecting said upstream signals and reinitiating the third time period measurement only upon the subsequent cessation of said upstream signals;

said BIU in said preempted state upon successfully completing the third time period measurement transitioning to a second transmit state in which it commences transmission of said second type information packet; and said BIU in said second transmit state ceasing transmission upon detecting said upstream signals and transitioning to said preempted state, said BIU reverting from said second transmit state to said active state upon successfully completing transmission of its information packet.

23. The BIU of claim 22 wherein said preamble gap in said first type preamble has a duration selected to enable each said BIU receiving said first type information packet to reset for receipt thereof.

24. The BIU of claim 23 wherein the duration of said first time period is equal to the sum of the duration of said preamble gap and a first predetermined tolerance period, so that said BIU in said active state cannot successfully complete the first time period measurement upon detecting on said receive bus the preamble gap in said first type information packet transmitted by another BIU.

25. The BIU of claim 24 wherein the duration of said third time period is substantially equal to the duration of said preamble gap;

a group of said BIUs each in said active state and successfully transitioning to said wait state, only the most upstream BIU in said group successfully both transitioning to said first transmit state and completing transmission of its information packet, the remaining BIUs in said group transitioning to said preempted state from which they transition to said second transmit state and successfully complete information packet transmission in an order according to their serial positions along said transmit bus from upstream to downstream; and a first silent period equal to said third time period separating the respective information packets in a sequence of packets successfully transmitted by said group, so that said BIUs in said active state are unable to successfully complete measurement of said first time period upon detecting on said receive bus said first silent period separating the respective information packets in said packet sequence.

26. The BIU of claim 25 wherein the duration of said second time period is equal to a second predetermined tolerance period; and a second silent period following a last information packet in said packet sequence and having a duration at least equal to the sum of said first and second time periods;

whereby BIUs in said active state can successfully complete measurement of said first time period upon detecting said second silent period following the last information packet in said packet sequence.

27. The BIU of claim 22 wherein said information packets are each assigned a high, a normal, or a low priority;

said BIU in said active state having said high priority packet to transmit, transitioning to said wait state without measuring said first time period; and said BIU in said active state having said low priority packet to transmit initiating measurement of a fourth time period following completion of the first time period measurement and transitioning to said wait state only upon successfully completing the fourth time period measurement.

28. A method for transmitting information packets among a plurality of BIUs respectively coupled between a transmit bus and a receive bus at locations spaced therealong, said transmit bus coupled to said receive bus through means for directing signals leaving said transmit bus onto said receive bus, said BIUs each including means for transmitting and receiving signals on said transmit and receive buses respectively, each said BIU being coupled to a user device for which it both transmits and receives information packets, said method comprising the steps of:

(1) monitoring said transmit bus at each said BIU in an active state having an information packet to transmit to detect signals originating from an upstream direction away from said directing means;

(2) monitoring said receive bus at each said BIU in said active state to detect signals thereon;

(3) initiating measurement of a first time period at each said BIU in said active state upon detecting an absence of receive bus signals;

(4) ceasing the first time period measurement upon detecting receive bus signals;

(5) reinitiating the first time period measurement upon detecting a cessation of the receive bus signals;

(6) repeating steps (4) and (5) until the first time period measurement is successfully completed;

(7) transitioning said BIU to a wait state and initiating measurement of a second time period, upon successfully completing the first time period measurement;

(8) ceasing the second time period measurement and transitioning said BIU from said wait state to a preempted state upon detecting the presence of said upstream signals;

(9) transitioning said BIU, upon successfully completing the second time period measurement, from said wait state to a transmit state in which said BIU commences transmission of its information packet;

(10) reverting said BIU from said transmit state to said active state upon successful completion of its information packet transmission;

(11) ceasing information packet transmission and transitioning said BIU to said preempted state upon detecting the presence of said upstream signals;

(12) initiating measurement of a third time period at said BIU in said preempted state upon detecting the cessation of said upstream signals;

(13) ceasing the third time period measurement upon detecting said upstream signals;

(14) reinitiating the third time period measurement upon detecting cessation of said upstream signals;

(15) repeating steps (13) and (14) until measurement of said third time period is successfully completed;

(16) transitioning said BIU to said transmit state upon successfully completing the third time period measurement; and (17) repeating steps (11) through (16) until information packet transmission is successfully completed at which time said BIU reverts to said active state.

29. The method of claim 28 wherein each said information packet includes a preamble having a gap portion during which no signal is transmitted, said preamble gap having a duration selected to enable each said BIU receiving said information packet including said gap to reset for receipt of a new packet.

30. The method of claim 29 wherein said information packet has a duration that exceeds a total signal propagation delay along said transmit and receive buses by at least the sum of said second and third time periods.

31. The method of claim 29 wherein the duration of said first time period is equal to the sum of the duration of said preamble gap and a first predetermined tolerance period, so that each said BIU in said active state cannot successfully complete the first time period measurement upon detecting on said receive bus said preamble gap in the information packet transmitted by another BIU.

32. The method of claim 28 wherein said information packets are each assigned a high, a normal, or a low priority;

said method including the additional step, between steps (2) and (3), of:

proceeding directly to step (7) if said BIU in said active state has said high priority packet to transmit; and step (3) of said method including the substep of adding a fourth time period to said first time period if said BIU in said active state has said low priority packet to transmit, so that the last recited BIU transitions to said wait state only upon successfully completing measurement of said first and fourth time periods.

33. A method for transmitting information packets among a plurality of BIUs respectively coupled between a transmit bus and a receive bus at locations spaced therealong, said transmit bus coupled to said receive bus through means for directing signals leaving said transmit bus onto said receive bus, said BIUs each including means for transmitting and receiving signals on said transmit and receive buses respectively, each said BIU being coupled to a user device for which it both transmits and receives information packets, said method comprising the steps of:

(1) monitoring said transmit bus at each said BIU in an active state having an information packet to transmit to detect signals originating from an upstream direction away from said directing means;

(2) monitoring said receive bus at each said BIU in said active state to detect signals thereon;

(3) initiating measurement of a first time period at each said BIU in said active state upon detecting an absence of receive bus signals;

(4) ceasing the first time period measurement upon detecting receive bus signals;

(5) reinitiating the first time period measurement upon detecting a cessation of the receive bus signals;

(6) repeating steps (4) and (5) until the first time period measurement is successfully completed;

(7) transitioning said BIU to a wait state and initiating measurement of a second time period, upon successfully completing the first time period measurement;

(8) ceasing the second time period measurement and transitioning said BIU from said wait state to said preempted state upon detecting the presence of said upstream signals;

(9) transitioning said BIU, upon successfully completing the second time period measurement, from said wait state to a first transmit state in which said BIU commences transmission of a first type information packet, said first type information packet having a first type preamble including a gap portion during which no signal is transmitted;

(10) reverting said BIU from said first transmit state to said active state upon its successfully completing transmission of said first type information packet;

(11) ceasing transmission and transitioning said BIU to said preempted state upon detecting the presence of said upstream signals during transmission;

(12) initiating measurement of a third time period at said BIU in said preempted state upon detecting the cessation of said upstream signals;

(13) ceasing the third time period measurement upon detecting said upstream signals;

(14) reinitiating the third time period measurement upon detecting cessation of said upstream signals;

(15) repeating steps (13) and (14) until measurement of said third time period is successfully completed;

(16) transitioning said BIU, upon successfully completing the third time period measurement, from said preempted state to a second transmit state in which said BIU commences transmission of a second type information packet, said second type information packet having a second type preamble shorter in length than said first type preamble and without said gap portion;

(17) ceasing transmission and transitioning said BIU to said preempted state upon detecting the presence of said upstream signals during transmission;

(18) repeating steps (12) through (17) until said second type information packet is successfully transmitted; and (19) reverting said BIU from said second transmit state to said active state upon successful completion of step (18).

34. The method of claim 33 wherein said preamble gap in said first type preamble has a duration selected to enable each said BIU receiving said first type information packet to reset for receipt thereof.

35. The method of claim 34 wherein the duration of said first time period is equal to the sum of the duration of said preamble gap and a first predetermined tolerance period, so that said BIU in said active state cannot successfully complete the first time period measurement upon detecting on said receive bus the preamble gap in said first type information packet transmitted by another BIU.

36. The method of claim 33 wherein said information packets are each assigned in a high, a normal, or a low priority;

said method including the additional step, between steps (2) and (3), of:

proceeding directly to step (7) if said BIU in said active state has said high priority packet to transmit; and step (3) of said method including the substep of adding a fourth time period to said first time period if said BIU in said active state has said low priority packet to transmit, so that the last recited BIU transitions to said wait state only upon successfully completing measurement of said first and fourth time periods.

* * * * *